US012770858B2

(12) United States Patent
Tanaka et al.

(10) Patent No.: US 12,770,858 B2
(45) Date of Patent: Oct. 20, 2026

(54) METHOD FOR MANUFACTURING RECHARGEABLE BATTERY AND APPARATUS FOR MANUFACTURING RECHARGEABLE BATTERY

(71) Applicants: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Katsuya Tanaka, Kosai (JP); Hiroaki Ikeda, Toyota (JP)

(73) Assignees: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 686 days.

(21) Appl. No.: 18/197,205

(22) Filed: May 15, 2023

(65) Prior Publication Data

US 2023/0378426 A1 Nov. 23, 2023

(30) Foreign Application Priority Data

May 17, 2022 (JP) ................................ 2022-080750

(51) Int. Cl.
*H01M 4/04* (2006.01)
*H01M 10/04* (2006.01)

(52) U.S. Cl.
CPC ....... *H01M 4/0471* (2013.01); *H01M 4/0404* (2013.01); *H01M 10/0404* (2013.01)

(58) Field of Classification Search
CPC ............. H01M 4/0471; H01M 4/0404; H01M 10/0404; H01M 4/04; H01M 4/0435; (Continued)

(56) References Cited

U.S. PATENT DOCUMENTS 5,914,094 A 6/1999 Sun et al.

FOREIGN PATENT DOCUMENTS

JP H09-175825 A 7/1997
JP H10116604 A * 5/1998

(Continued)

OTHER PUBLICATIONS

Stein et al. Mechanistic Understanding of the Role of Evaporation in Electrode Processing. Journal of the Electrochemical Society, 164 (7) A1616-A1627 (2017). (Year: 2017).*

*Primary Examiner* — William P Fletcher, III
(74) *Attorney, Agent, or Firm* — Maschoff Brennan

(57) ABSTRACT

A method for manufacturing a rechargeable battery including applying an electrode mixture that includes an electrode active material to a substrate that becomes a current collector, drying the applied electrode mixture, obtaining a specific surface area of the electrode active material before the drying the applied electrode mixture, in which the obtained specific surface area of the electrode active material is referred to as an obtained specific surface area, and a specific surface area of the electrode active material in a state in which the electrode mixture applied to the substrate forms an electrode plate is referred to as an electrode plate specific surface area; and adjusting the electrode plate specific surface area after the drying the applied electrode mixture by setting a drying condition of the electrode mixture in accordance with the obtained specific surface area.

4 Claims, 9 Drawing Sheets

(58) Field of Classification Search
CPC ...... H01M 4/139; Y02E 60/10; B05D 3/0254; B05D 7/24
See application file for complete search history.

(56) References Cited

FOREIGN PATENT DOCUMENTS

| | | | | |
|---|---|---|---|---|
| JP | 2005-019094 | A | | 1/2005 |
| JP | 2011129400 | A | * | 6/2011 |

* cited by examiner

77

| Difference of Obtained Value and Standard Value (δ=Sd-Sc) | Target Drying Change Amount (ΔST=ΔSC-δ) | Drying Temperature (T) |
|---|---|---|
| 0. 0 | 0. 1 | 175 |
| -0. 1 | 0. 2 | 177 |
| -0. 2 | 0. 3 | 180 |
| -0. 3 | 0. 4 | 182 |
| -0. 4 | 0. 5 | 184 |
| | | |
| ... | ... | ... |

Fig.15
77B
| Obtained Specific Surface Area (Sd) | Drying Temperature (T) |
|---|---|
| • • • | • • • |
| • • • | • • • |
| • • • | • • • |
| | |
| • • • | • • • |
Fig.16
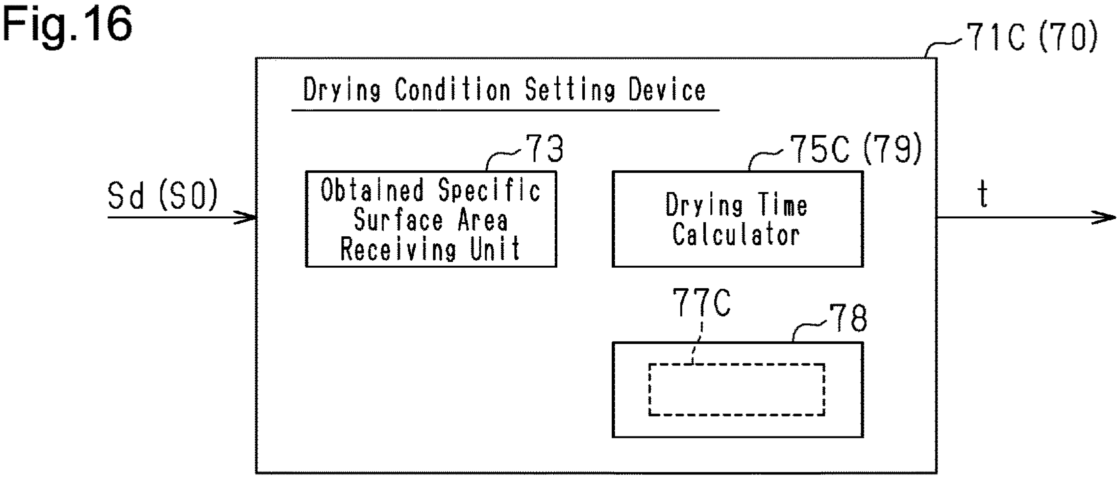
Fig.17
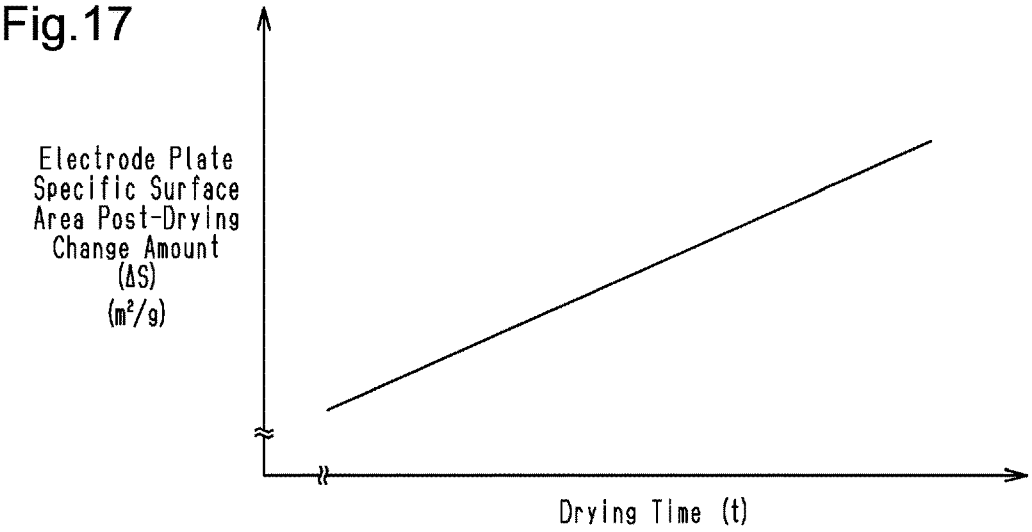

77C

| Obtained Specific Surface Area (Sd) | Drying Time (t) |
|---|---|
| • • • | • • • |
| • • • | • • • |
| • • • | • • • |
| | |
| • • • | • • • |

77D

| Obtained Specific Surface Area (Sd) | Drying Temperature (T) | Drying Time (t) |
|---|---|---|
| • • • | • • • | • • • |
| • • • | • • • | • • • |
| • • • | • • • | • • • |
| | | |
| • • • | • • • | • • • |

METHOD FOR MANUFACTURING RECHARGEABLE BATTERY AND APPARATUS FOR MANUFACTURING RECHARGEABLE BATTERY

BACKGROUND

1. Field

The following description relates to a method for manufacturing a rechargeable battery and an apparatus for manufacturing a rechargeable battery.

2. Description of Related Art

A rechargeable battery, such as a lithium-ion rechargeable battery, typically includes an electrode plate formed by applying an electrode mixture including an electrode active material to a substrate that becomes a current collector. In such a rechargeable battery, the specific surface area of the electrode active material included in the electrode mixture greatly affects the battery performance. Accordingly, Japanese Laid-Open Patent Publication No. 2005-19094 describes an example of a preferred range of the specific surface area of an electrode active material forming a negative electrode. Japanese Laid-Open Patent Publication No. 9-175825 describes an example of the relationship between a firing temperature of a precursor of an electrode active material and the specific surface area of an electrode active material.

SUMMARY

Further, the electrode active material, serving as a raw material of the electrode mixture, usually tolerates variations in the specific surface area within a predetermined range. In a state in which the electrode mixture applied to a substrate forms an electrode plate, the specific surface area of the electrode active material is referred to an electrode plate specific surface area. Taking into consideration uniformity of the battery performance, it is preferred that variations of the electrode plate specific surface area be minimized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for manufacturing a rechargeable battery includes applying an electrode mixture that includes an electrode active material to a substrate that becomes a current collector, drying the applied electrode mixture, obtaining a specific surface area of the electrode active material before the drying the applied electrode mixture, in which the obtained specific surface area of the electrode active material is referred to as an obtained specific surface area, and a specific surface area of the electrode active material in a state in which the electrode mixture applied to the substrate forms an electrode plate is referred to as an electrode plate specific surface area; and adjusting the electrode plate specific surface area after the drying the applied electrode mixture by setting a drying condition of the electrode mixture in accordance with the obtained specific surface area.

In the above method, a drying temperature of the electrode mixture may be set as the drying condition. The drying temperature may be set to be higher as the obtained specific surface area becomes smaller.

In the above method, a drying time of the electrode mixture may be set as the drying condition. The drying time may be set to be longer as the obtained specific surface area becomes smaller.

In the above method, the drying condition may be set based on a change amount of the electrode plate specific surface area that varies in accordance with the drying condition so as to correct a difference of the obtained specific surface area and a predetermined standard specific surface area.

The above method may further include blending raw materials of the electrode mixture, and kneading the blended electrode mixture. The kneaded electrode mixture may be applied to the substrate. The specific surface area of the electrode active material obtained before the blending raw materials may serve as the obtained specific surface area.

In another general aspect, an apparatus for manufacturing a rechargeable battery applies an electrode mixture that includes an electrode active material to a substrate that becomes a current collector and dries the applied electrode mixture. A specific surface area of the electrode active material obtained before the electrode mixture is dried is referred to as an obtained specific surface area. A specific surface area of the electrode active material in a state in which the electrode mixture applied to the substrate forms an electrode plate is referred to as an electrode plate specific surface area. The apparatus includes an obtained specific surface area receiving unit and a drying condition calculator. The obtained specific surface area is input to the obtained specific surface area receiving unit. The drying condition calculator calculates a drying condition of the electrode mixture in accordance with the input obtained specific surface area to adjust the electrode plate specific surface area after the electrode mixture is dried.

Other features and aspects will be apparent from the following detailed description, the drawings, and the claims.

BRIEF DESCRIPTION OF THE DRAWINGS

FIG. 15 is a diagram illustrating another example in which the drying temperature is set in accordance with the obtained specific surface area.

FIG. 16 is a schematic diagram showing another example of the drying condition setting device.

FIG. 17 is a diagram illustrating the relationship between the change amount of the electrode plate specific surface area resulting from drying the electrode mixture and a drying time.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment related to a method for manufacturing a rechargeable battery will now be described with reference to the drawings.

Figure 1:
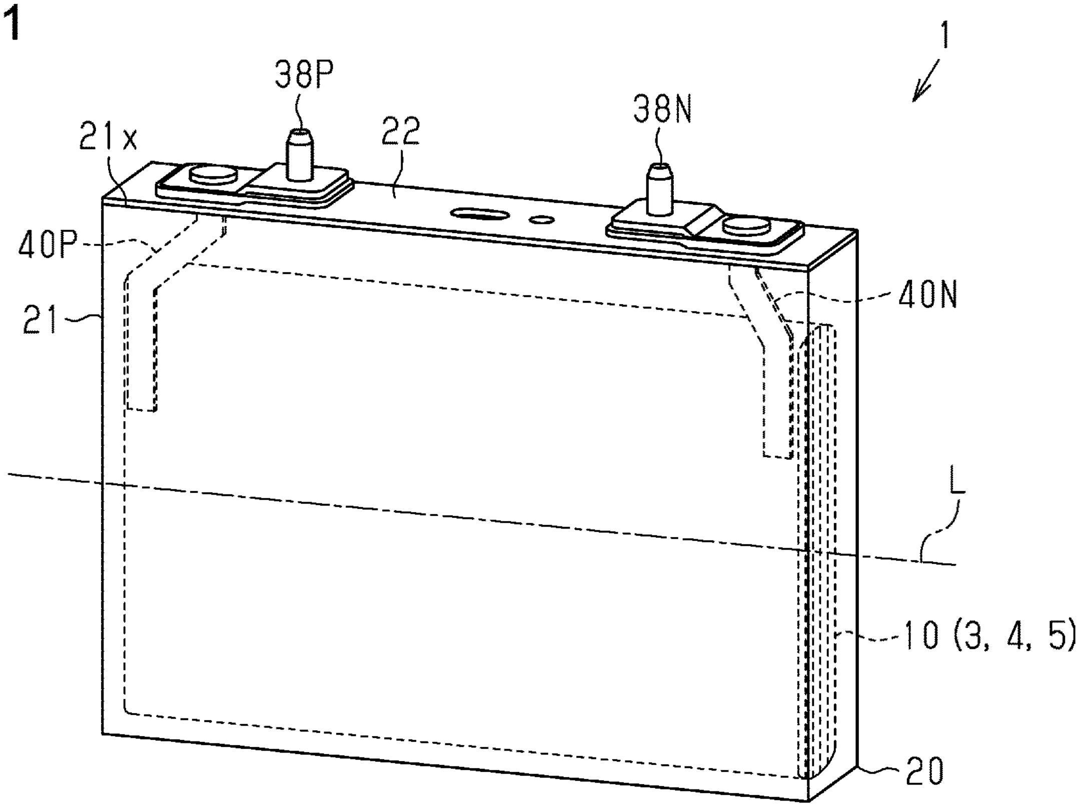
FIG. 1 is a perspective view of a rechargeable battery.

As shown in FIG. 1, a rechargeable battery 1 includes an electrode body 10 and a case 20. The electrode body 10 integrates a positive electrode 3, a negative electrode 4, and a separator 5. The case 20 accommodates the electrode body 10. The rechargeable battery 1 of the present embodiment has a structure of a lithium-ion rechargeable battery in which the electrode body 10 inside the case 20 is impregnated with a non-aqueous electrolyte (not shown).

Specifically, the rechargeable battery 1 of the present embodiment includes a stack of sheets of the positive electrode 3, the negative electrode 4, and the separator 5. The stack of the positive electrode 3, the negative electrode 4, and the separator 5 is rolled to form the electrode body 10 in which the positive electrode 3, the negative electrode 4, and the separator 5 are alternately arranged with the separator 5 held in between in a radial direction.

Further, the case 20 of the present embodiment includes a flat box-shaped case body 21 and a lid 22 that closes an open end 21*x* of the case body 21. The electrode body 10 of the present embodiment has a flattened shape that corresponds to the box-shape of the case 20.

Figure 2:
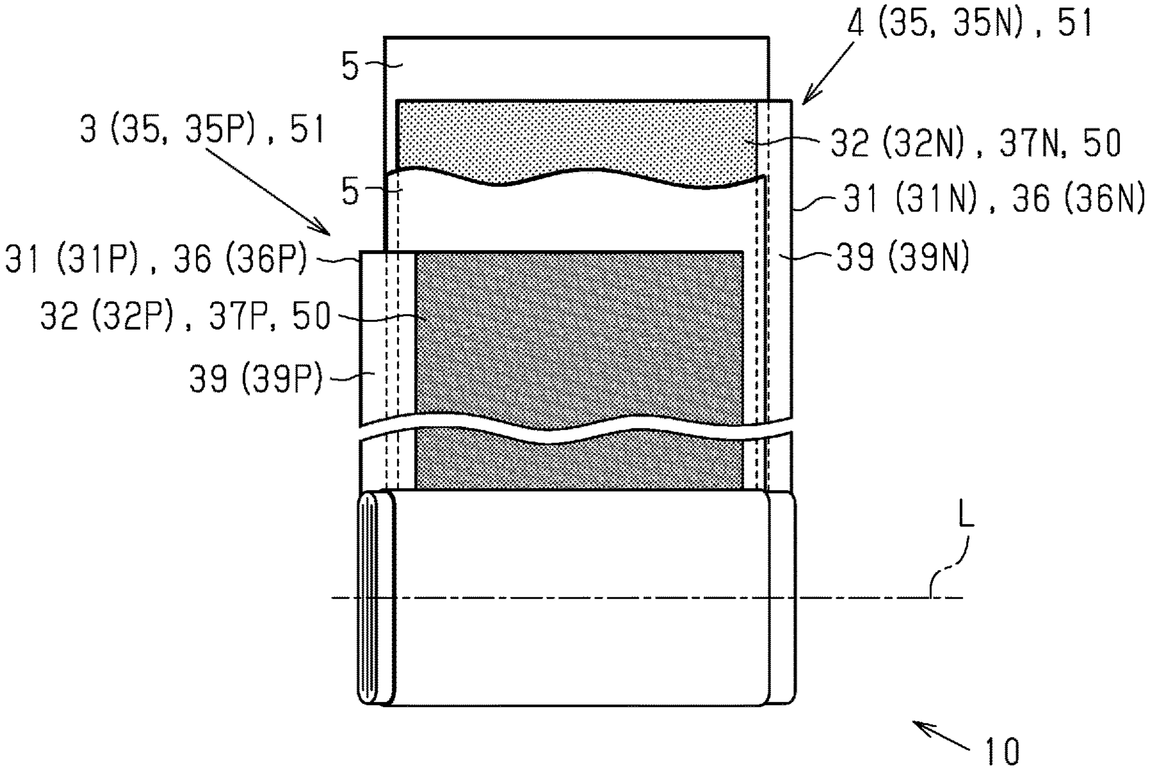
FIG. 2 is an exploded view of an electrode body.

More specifically, as shown in FIG. 2, in the rechargeable battery 1 of the present embodiment, each of the positive electrode 3 and the negative electrode 4 includes an electrode sheet 35. Each electrode sheet 35 includes a sheet-shaped current collector 31 and an electrode active material layer 32 formed on the current collector 31.

Specifically, in an electrode sheet 35P of the positive electrode 3, a mixture paste 37P including a lithium transition metal oxide is applied to a substrate 36P including aluminum and the like. The mixture paste 37P serves as the positive electrode active material. The substrate 36P forms a positive electrode current collector 31P of the electrode sheet 35P. Also, in an electrode sheet 35N of the negative electrode 4, a mixture paste 37N including a carbon-base material is applied to a substrate 36N including copper and the like. The mixture paste 37N serves as the negative electrode active material. The substrate 36N forms a negative electrode current collector 31N of the electrode sheet 35N. Further, the mixture pastes 37P and 37N each include a binder. In the rechargeable battery 1 of the present embodiment, the mixture pastes 37P and 37N are dried to form a positive electrode active material layer 32P and a negative electrode active material layer 32N on the positive and negative electrode sheets 35P and 35N, respectively.

In the rechargeable battery 1 of the present embodiment, the positive and negative electrode sheets 35P and 35N are shaped as strips. The electrode body 10 of the present embodiment is formed by rolling the stack of the positive and negative electrode sheets 35P and 35N with the separator 5 held in between about a rolling axis L that extends in a widthwise direction (sideward direction in FIG. 2) of the strips.

In FIG. 2, the separators 5 and the electrode sheets 35 are rolled with the electrode sheet 35P of the positive electrode 3 arranged at the inner side. However, FIG. 2 illustrates only one example of the structure of the electrode body 10. Thus, the separators 5 and the electrode sheets 35 may also be rolled with the electrode sheet 35N of the negative electrode 4 arranged at the inner side. Such arrangement determines whether the outermost electrode sheet 35 of the electrode body 10 will be the electrode sheet 35P of the positive electrode 3 or the electrode sheet 35N of the negative electrode 4.

Figure 3:
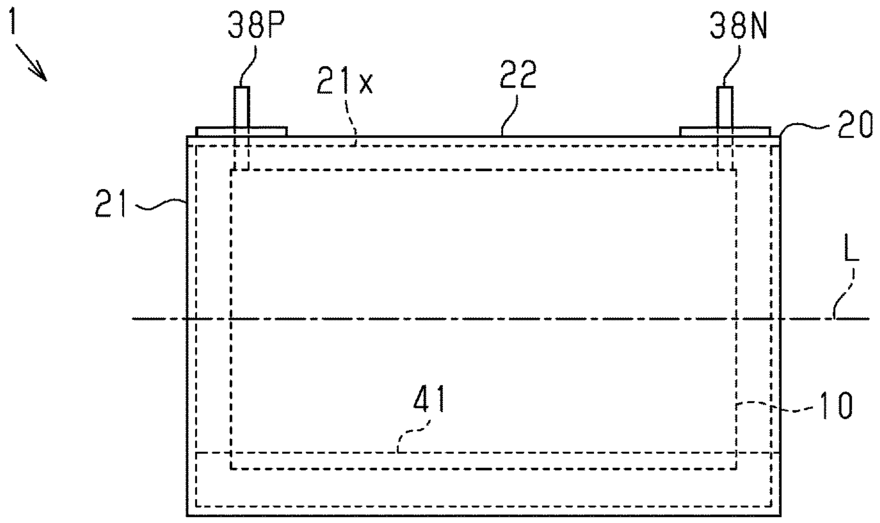
FIG. 3 is a side view of the rechargeable battery.

As shown in FIGS. 1 to 3, the lid 22 of the case 20 includes a positive electrode terminal 38P and a negative electrode terminal 38N that project outward from the case 20. Further, each electrode sheet 35 includes an uncoated portion 39 where the electrode active material layer 32 is not formed on the current collector 31. The rechargeable battery 1 of the present embodiment uses the uncoated portion 39 to electrically connect the electrode sheet 35P of the positive electrode 3 to the positive electrode terminal 38P and the electrode sheet 35N of the negative electrode 4 to the negative electrode terminal 38N.

Specifically, the electrode body 10 of the present embodiment is accommodated in the case 20 so that the rolling axis L is parallel to a longitudinal direction (sideward direction in FIG. 1) of the lid 22 that has the form of a substantially elongated rectangular plate. Further, in such a state, a connector 40P connects the uncoated portion 39P of the electrode sheet 35P of the positive electrode 3 to the positive electrode terminal 38P. In the same manner, a connector 40N connects the uncoated portion 39N of the electrode sheet 35N of the negative electrode 4 to the negative electrode terminal 38N.

An electrolyte 41 is injected into the case 20. The rechargeable battery 1 of the present embodiment uses a fluorine-based electrolyte 41 in which lithium salt, serving as a supporting electrolyte, is dissolved in an organic solvent. In the rechargeable battery 1 of the present embodiment, the electrode body 10 is impregnated with the electrolyte 41 sealed in the case 20.

Electrode Sheet Manufacturing Process

Figure 4:
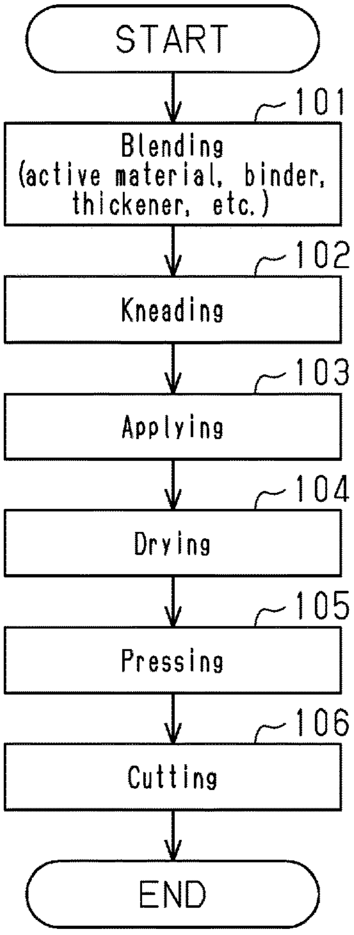
FIG. 4 is a flowchart illustrating a manufacturing process of an electrode sheet that forms an electrode plate of the rechargeable battery.

As the flowchart shown in FIG. 4 illustrates, raw materials of an electrode mixture 50, such as an electrode active material, a binder, a thickener, and the like, are first blended in the manufacturing process of the electrode sheet 35 of the rechargeable battery 1 of the present embodiment (step 101). The blended electrode mixture 50 is kneaded (step 102).

Then, the electrode mixture 50 kneaded in step 102 is applied to the substrate 36P as the mixture paste 37P, and the electrode mixture 50 kneaded in step 102 is applied to the substrate 36N as the mixture paste 37N (step 103, refer to FIG. 2). Subsequently, the electrode mixture 50 applied in step 103 is dried (step 104). In the present embodiment, the applying step in step 102 and the drying step in step 103 are performed continuously. Further, the substrate 36 and the electrode mixture 50 are pressed in a state in which the electrode mixture 50 applied to the substrate 36 forms the positive or negative electrode, or an electrode plate 51, in order to increase the adhesion strength of the electrode mixture 50 to the substrate 36 (step 105). In the rechargeable battery 1 of the present embodiment, a cutting step (step 106) is performed after the pressing step. This manufactures a strip of the foil-like electrode sheet 35.

Figure 5:
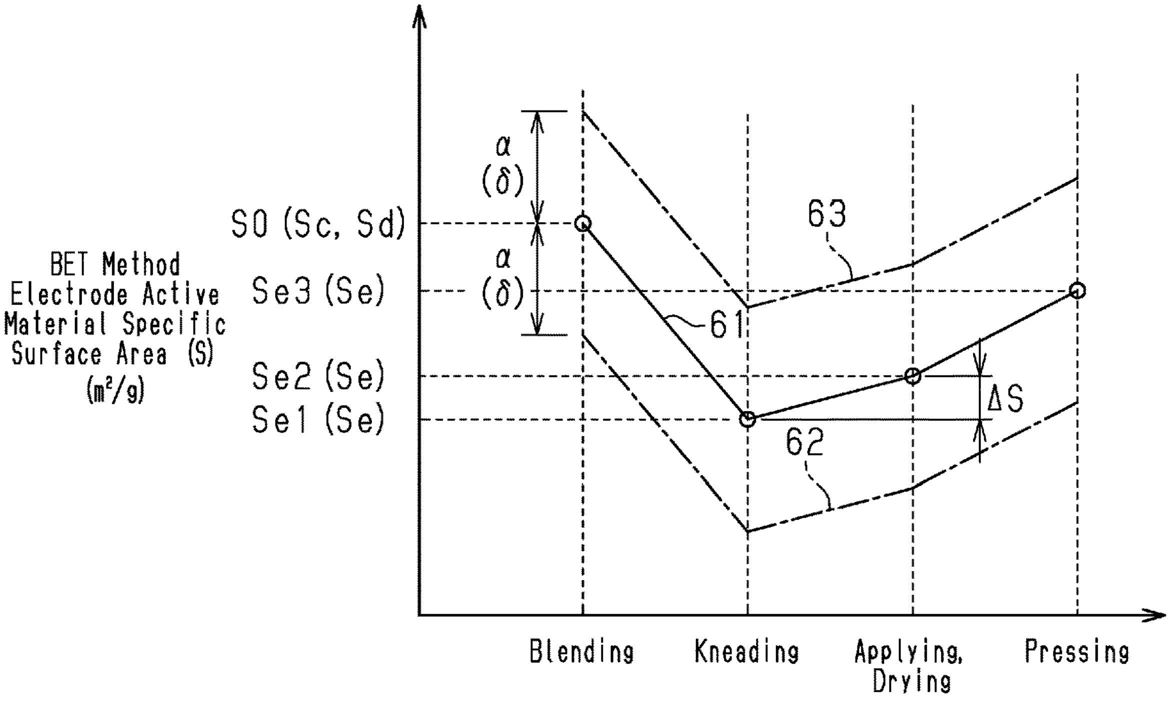
FIG. 5 is a graph illustrating the relationship between the manufacturing process of the electrode sheet and the specific surface area of an electrode active material.

Electrode Sheet Manufacturing Process and Specific Surface Area of Electrode Active Material As shown in FIG. 5, the specific surface area of the electrode active material used in the rechargeable battery 1 changes throughout the manufacture of the electrode sheet 35.

Specifically, when specific surface area S of the electrode active material before blending the raw materials (refer to FIG. 4, step 101) is referred to as initial specific surface area S0, the blending step (step 102) causes specific surface area S of the electrode active material to become less than initial specific surface area S0. The term "specific surface area of electrode active material" is typically used to indicate initial specific surface area S0. Also, when specific surface area S of the electrode active material in a state in which the electrode mixture 50 applied to the substrate 36 forms the electrode plate 51 is referred to as electrode plate specific surface area Se, the value of electrode plate specific surface area Se immediately after the electrode active material is applied to the substrate 36 (step 103), or pre-drying electrode plate specific surface area Se1, is equal to the value after kneading the electrode mixture 50. Further, the value of specific surface area S of the electrode active material after the drying step (step 104), or post-drying electrode plate specific surface area Se2, becomes greater than pre-drying electrode plate specific surface area Se1. When specific surface area S of the electrode active material after the pressing step (step 105) is referred to as post-pressing electrode plate specific surface area Se3, post-pressing electrode plate specific surface area Se3 becomes greater than post-drying electrode plate specific surface area Se2.

The specific surface area of porous powder such as the electrode active material is measured by, for example, a gas adsorption measurement method using a Brunauer-Emmett-Teller (BET) equation, that is, a BET method. The unit used is "square meter/gram". The specific surface area measured by the BET method will be referred to as the "BET specific surface area". In the present embodiment, measure specific surface area S of the electrode active material is measured by a BET method that uses nitrogen as the gaseous adsorbate.

Figure 6:
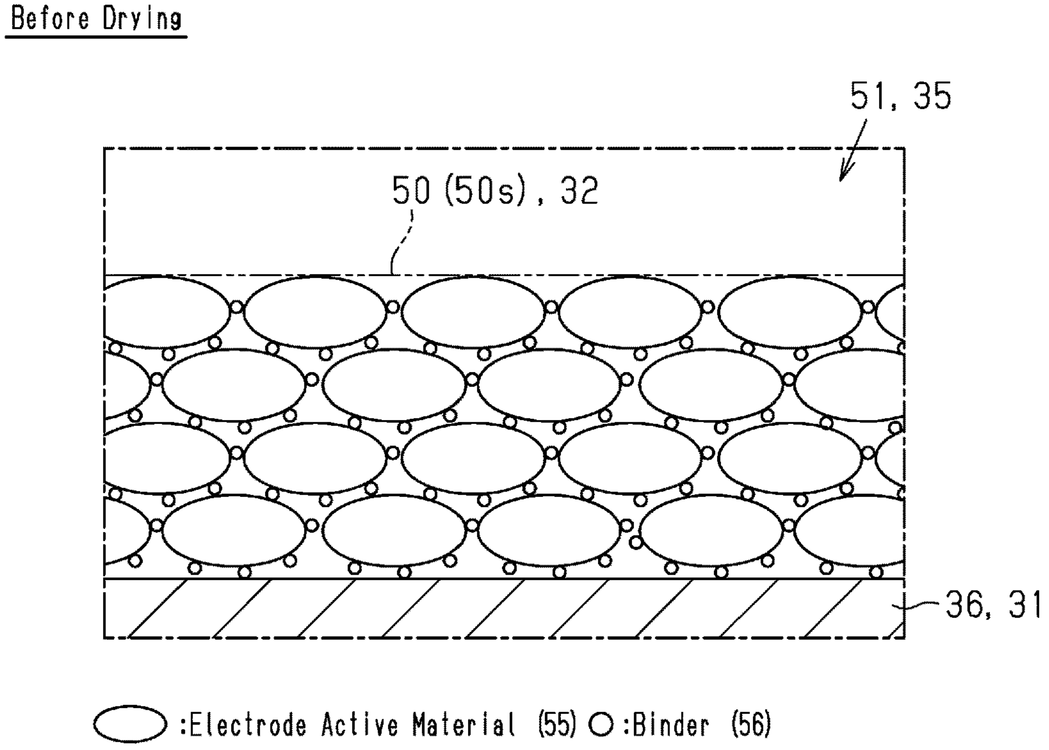
FIG. 6 is a diagram showing a state of an electrode mixture applied to a substrate before the electrode mixture is dried.

More specifically, as shown in FIG. 6, the blending step causes a binder 56 to adhere to an electrode active material 55 in the electrode mixture 50. This decreases specific surface area S of the electrode mixture. Thus, even in a state in which the electrode mixture 50 forms the electrode plate 51 together with the substrate 36, pre-drying electrode plate specific surface area Se1 is less than the pre-blending value, or initial specific surface area S0 (refer to FIG. 5, S0>Se1).

Figure 7:
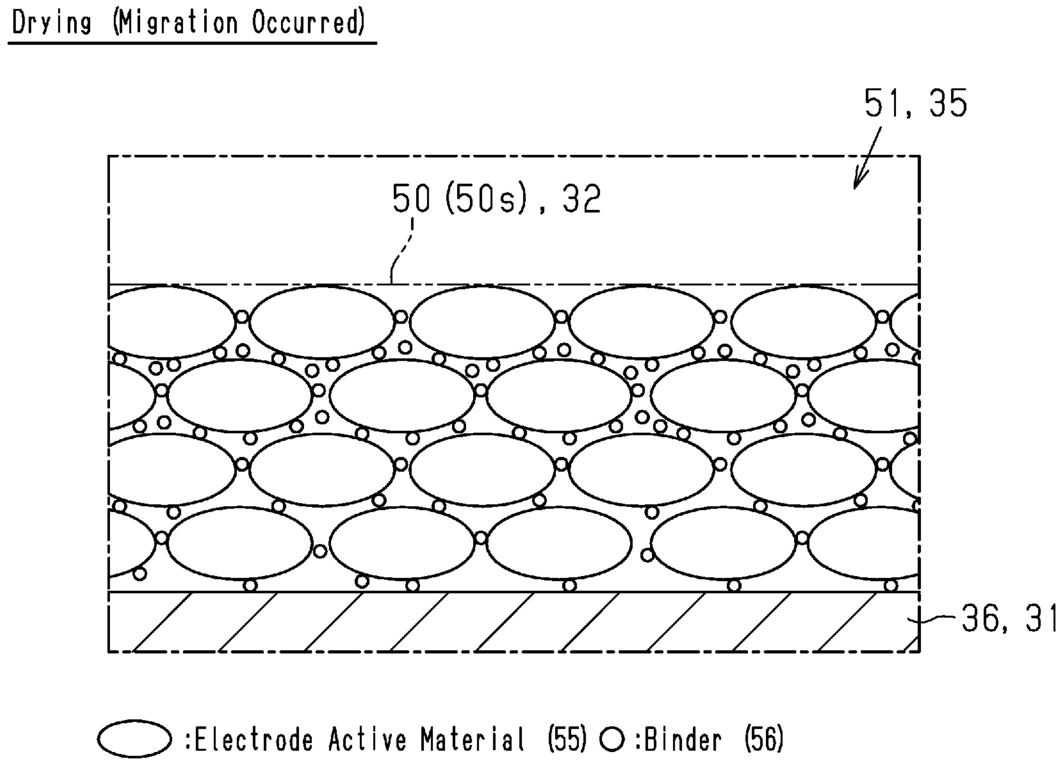
FIG. 7 is a diagram showing a state of the electrode mixture applied to the substrate after the electrode mixture is dried.

Also, as shown in FIG. 7, when the electrode mixture 50 applied to the substrate 36 dries, movement, or migration, of the binder 56 will occur in the electrode mixture 50 as a solvent (not shown) evaporates. Specifically, the solvent in the electrode mixture 50 evaporates from an upper surface 50*s* of the electrode mixture 50 applied to the substrate 36 (upper side in FIG. 7). In this case, the binder 56 included in the electrode mixture 50 separates from the electrode active material 55 and moves through the electrode mixture 50 together with the solvent from a position closer to the substrate 36 to a position closer to the upper surface 50*s* of the electrode mixture 50 (upper side in FIG. 7). Then, desorption of the binder 56 resulting from the occurrence of migration increases specific surface area S of the electrode active material 55 included in the electrode mixture 50. Thus, post-drying electrode plate specific surface area Se2 is greater than pre-drying electrode plate specific surface area Se1 (refer to FIG. 5, Se1<Se2).

Normally, particles of the binder 56 moved toward the upper surface 50*s* as a result of the migration aggregate between particles of the electrode active material 55. Such segregated state of the binder 56 resulting from the migration may be expressed by "ratio (front surface side/substrate side)" as "migration index", in which the electrode mixture 50 applied to the substrate 36 is divided into the side of the upper surface 50*s* and the side of the substrate 36.

Further, the pressing step squeezes the electrode active material 55 in the electrode mixture 50 and increases specific surface area S of the electrode active material 55. Thus, post-pressing electrode plate specific surface area Se3 is greater than post-drying electrode plate specific surface area Se2 (refer to FIG. 5, Se2<Se3).

As shown in FIG. 5, in the rechargeable battery 1 of the present embodiment, when manufacturing the electrode sheet 35, standard specific surface area Sc is set in advance as the standard value of specific surface area S of the electrode active material 55. Specifically, in the rechargeable battery 1 of the present embodiment, standard specific surface area Sc is a specified value set for initial specific surface area S0, which is specific surface area S of the electrode active material 55 prior to the blending of raw materials. The rechargeable battery 1 of the present embodiment tolerates variations in initial specific surface area S0 within a predetermined range of tolerance $\alpha$ from standard specific surface area Sc serving as the standard center value ($S0=Sc\pm\alpha$).

Specifically, waveform 61 shown in FIG. 5 is a graph illustrating specific surface area S of the electrode active material 55 that changes throughout the manufacture of the electrode sheet 35 when initial specific surface area S0 is equal to standard specific surface area Sc. Waveform 62 shown in FIG. 5 is a graph illustrating specific surface area S of the electrode active material 55 that changes throughout the manufacture of the electrode sheet 35 when initial specific surface area S0 corresponds to the lower limit of the tolerable range (S0=Sc−α). Waveform 63 shown in FIG. 5 is a graph illustrating specific surface area S of the electrode active material 55 that changes throughout the manufacture of the electrode sheet 35 when initial specific surface area S0 corresponds to the upper limit of the tolerable range (S0=Sc+α).

Figure 8:
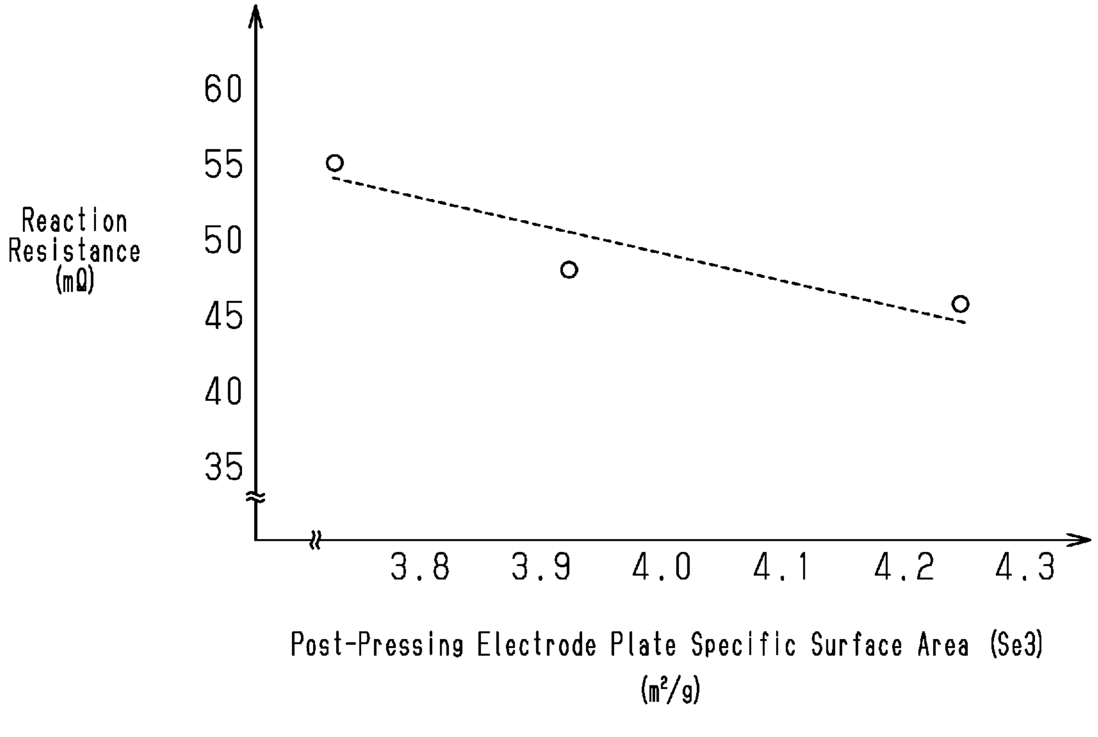
FIG. 8 is a graph illustrating the relationship of a post-pressing electrode plate specific surface area and battery performance.

Also, as shown in FIG. 8, in the rechargeable battery 1 of the present embodiment, post-pressing electrode plate specific surface area Se3 corresponds to specific surface area S of the electrode active material 55 in a state in which the electrode mixture 50 applied to the substrate 36 forms a substantially completed electrode plate 51. This post-pressing electrode plate specific surface area Se3 determines performance of the rechargeable battery 1.

In the graph shown in FIG. 8, the vertical axis indicates "battery resistance (reaction resistance)" that is an index of battery performance. The battery resistance (reaction resistance) refers to a value measured in an assembled battery by an "AC impedance method".

Further, as shown in FIG. 5, when initial specific surface area S0, which is specific surface area S of the electrode active material 55 prior to the blending of raw materials, differs from the predetermined standard specific surface area Sc, difference δ of initial specific surface area S0 and standard specific surface area Sc is likely to be maintained even after undergoing the above-described manufacturing steps if the manufacturing condition remains the same. Thus, tolerance α is typically set for initial specific surface area S0 of the electrode active material 55, which serves as a raw material of the rechargeable battery 1.

However, taking into consideration uniformity of the battery performance, it is preferred that variations of specific surface area S of the electrode active material 55 included in the electrode mixture 50 be minimized. Accordingly, in the rechargeable battery 1 of the present embodiment, a manufacturing condition for the manufacture of the electrode sheet 35 is set in accordance with specific surface area S of the electrode active material 55. Specifically, in the present embodiment, drying temperature T is set as the subject of a drying condition of the electrode mixture 50 to become higher as obtained specific surface area Sd decreases. This adjusts specific surface area S of the electrode active material 55 in a state in which the electrode mixture 50 applied to the substrate 36 forms the electrode plate 51, thereby improving uniformity of the battery performance.

In the rechargeable battery 1 of the present embodiment having a structure of a lithium-ion rechargeable battery, the battery performance is likely to be affected by variations of specific surface area S of the electrode active material 55 on the negative electrode 4 that receives lithium ions from the positive electrode 3 when charging the rechargeable battery 1. Therefore, in the present embodiment, the manufacturing condition is set in accordance with specific surface area S of the electrode active material 55 for the manufacture of the electrode sheet 35N of the negative electrode 4.

Setting Drying Condition in Accordance with Obtained Specific Surface Area

The drying condition is set in accordance with the obtained specific surface area of the electrode active material 55 when manufacturing the rechargeable battery 1 of the present embodiment.

Figure 9:
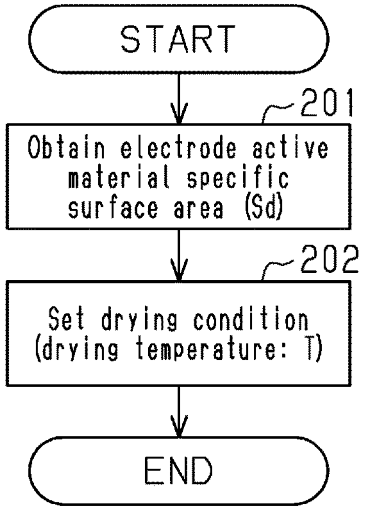
FIG. 9 is a flowchart illustrating a processing procedure for setting a drying condition in accordance with an obtained specific surface area of the electrode active material.

As shown in FIG. 9, when manufacturing the rechargeable battery 1 of the present embodiment, specific surface area S of the electrode active material 55 is obtained (step 201) before the step of drying the electrode mixture 50 applied to the substrate 36 (refer to FIG. 4, step 104). Specifically, in the present embodiment, initial specific surface area S0 of the electrode active material 55 is obtained in the step of blending the raw materials of the electrode mixture 50 (refer to FIG. 4, step 101). Further, in the present embodiment, specific surface area S of the electrode active material 55 obtained in step 201, or initial specific surface area S0, is referred to as obtained specific surface area Sd of the electrode active material 55 (refer to FIG. 5). Then, drying temperature T is set in accordance with obtained specific surface area Sd as the drying condition of the electrode mixture 50 applied to the substrate 36 (step 202).

As shown in FIGS. 5 to 7, when the electrode mixture 50 applied to the substrate 36 is dried, post-drying electrode plate specific surface area Se2 becomes greater than pre-drying electrode plate specific surface area Se1 (Se1<Se2). As described above, the change in electrode plate specific surface area Se between before and after the drying step is caused by the migration of the binder that occurs when the electrode mixture 50 is dried. Thus, advancement of the migration is affected by the drying condition of the electrode mixture 50 applied to the substrate 36. Accordingly, change amount ΔS of electrode plate specific surface area Se resulting from drying the electrode mixture 50 also corresponds to the drying condition of the electrode mixture 50.

Figure 10:
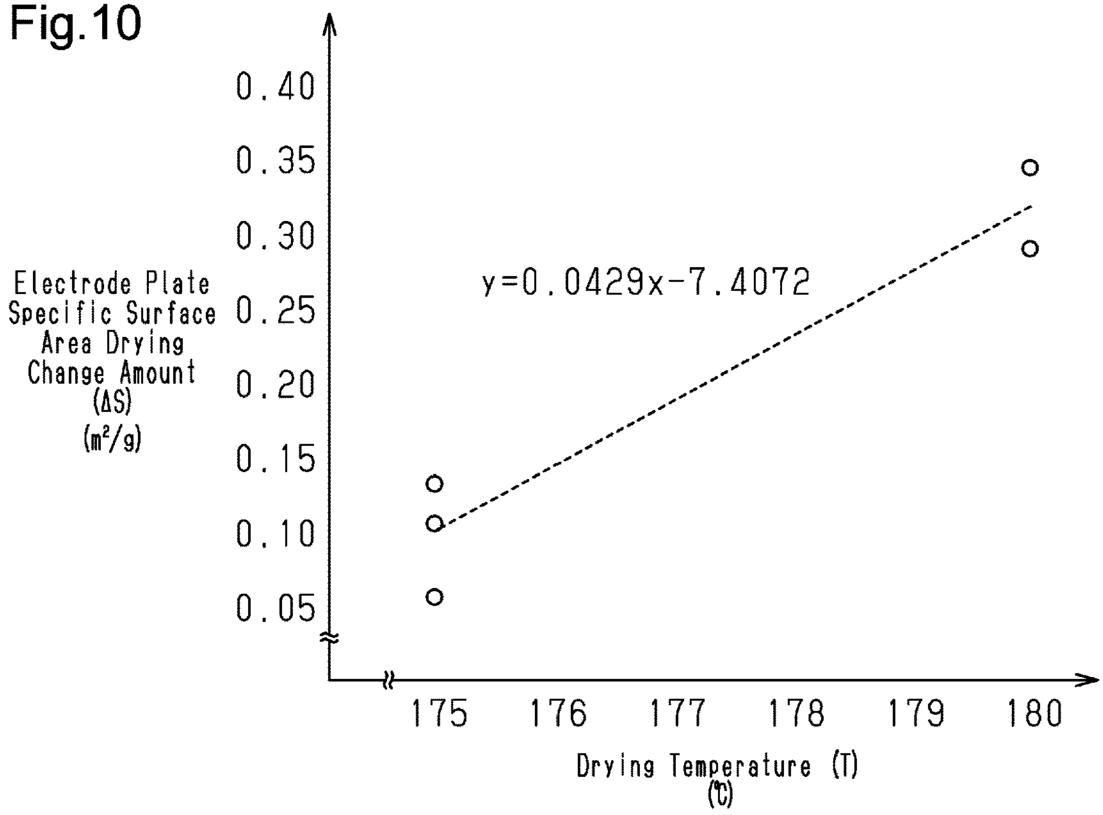
FIG. 10 is a graph illustrating the relationship of a change amount of the electrode plate specific surface area resulting from drying the electrode mixture and a drying temperature.

As shown in FIG. 10, for example, when different drying temperatures T are set with other drying conditions, such as drying time and the like, remaining the same, change amount ΔS of electrode plate specific surface area Se between before and after the drying step becomes substantially proportional to drying temperature T. In the example shown in FIG. 10, a drying test was conducted a number of times on the electrode mixture 50 applied to the substrate 36 when drying temperature T was set to "175° C." and when drying temperature T was set to "180° C.". The test results indicate that there is a correlation between change amount ΔS of electrode plate specific surface area Se resulting from drying the electrode mixture 50 and drying temperature T. The correlation is expressed by the linear approximate equation "y=ax−b, ("a" and "b" are coefficient)" with "y" representing change amount ΔS of electrode plate specific surface area Se and "x" representing drying temperature T.

Accordingly, in the rechargeable battery 1 of the present embodiment, drying temperature T is set in accordance with obtained specific surface area Sd to adjust post-drying electrode plate specific surface area Se2. Consequently, this reduces variations of specific surface area S of the electrode active material 55 included in the electrode mixture 50 applied to the substrate 36.

Figures 11, 12:
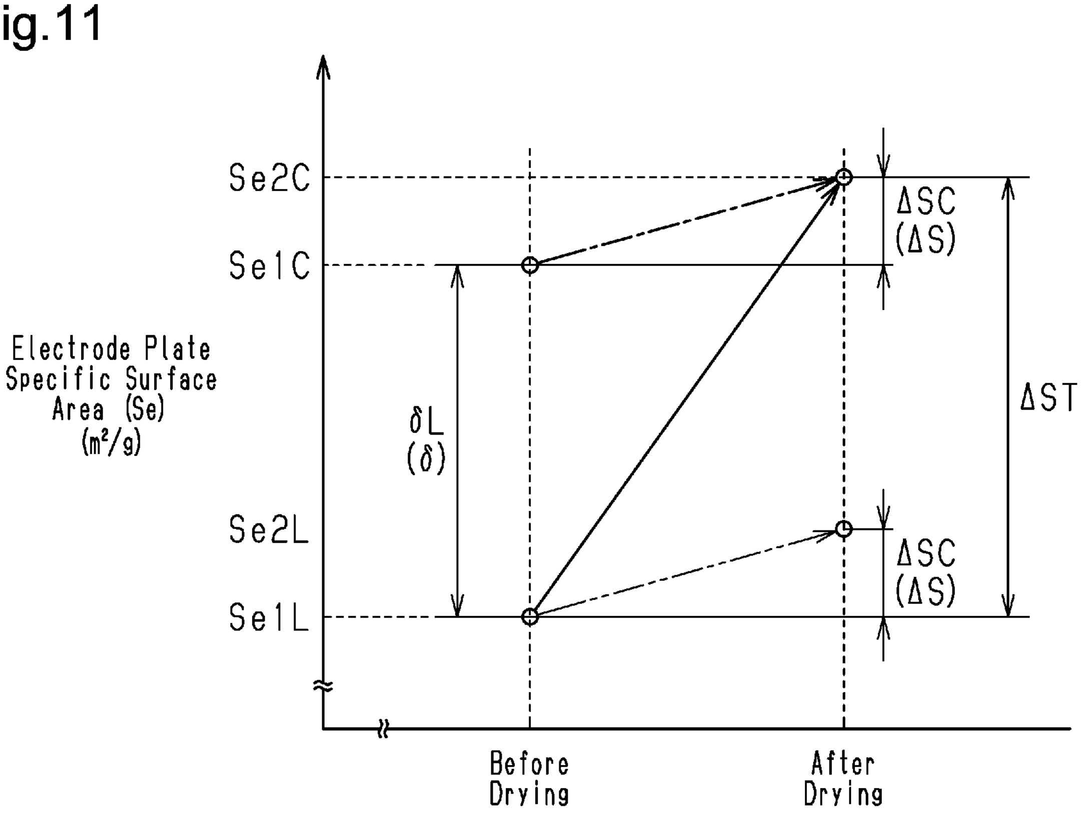
FIG. 11 is a diagram illustrating a method for adjusting the electrode plate specific surface after the electrode plate is dried by setting a drying condition that is in accordance with the obtained specific surface area.
FIG. 12 is a table illustrating the relationship between a difference of the obtained specific surface area and a standard specific surface area, a target drying change amount of the electrode plate specific surface area, and the drying temperature set as the drying condition.

Specifically, for example, as shown in FIG. 11, when initial specific surface area S0 serving as obtained specific surface area Sd is equal to standard specific surface area Sc, pre-drying electrode plate specific surface area Se1 is represented by "Se1C" and post-drying electrode plate specific surface area Se2 is represented by "Se2C" (refer to FIG. 5). Further, when obtained specific surface area Sd is less than standard specific surface area Sc, pre-drying electrode plate specific surface area Se1 is represented by "Se1L", and post-drying electrode plate specific surface area Se2 is represented by "Se2L".

Even in these cases, if the manufacturing condition, such as the drying condition, remains the same, change amount ΔS of electrode plate specific surface area Se resulting from drying the electrode mixture 50 is substantially equal, as described above (refer to FIG. 5). When obtained specific surface area Sd is less than standard specific surface area Sc, difference δL of pre-drying electrode plate specific surface area Se1L and the standard center value Se1C of pre-drying electrode plate specific surface area Se1L is substantially equal to difference δ of obtained specific surface area Sd and standard specific surface area Sc.

Based on these relationships, target drying change amount ΔST for correcting difference δ of obtained specific surface area Sd and standard specific surface area Sc can be calculated with respect to change amount ΔS of electrode plate specific surface area Se resulting from drying the electrode mixture 50 applied to the substrate 36. This allows drying temperature T to be set to reduce variations of post-drying electrode plate specific surface area Se2 caused by differences in initial specific surface area S0 serving as obtained specific surface area Sd.

Under a predetermined drying condition, change amount ΔS of electrode plate specific surface area Se resulting from drying the electrode mixture 50 is referred to as reference change amount ΔSC. Further, for example, difference δ of obtained specific surface are Sd and standard specific surface area Sc is represented by "δ=Sd−Sc", and the value obtained by subtracting difference δ of obtained specific surface area Sd and standard specific surface area Sc from reference change amount ΔSC is referred to as target drying change amount ΔST (ΔST=ΔSC−δ). Then, drying temperature T is set based on target drying change amount ΔST so as to correct difference δ of obtained specific surface area Sd and standard specific surface area Sc.

Specifically, in the example shown in FIG. 10, the approximate equation "y=0.0429x−7.4072" represents the relationship of drying temperature T and change amount ΔS of electrode plate specific surface area Se resulting from drying the electrode mixture 50 applied to the substrate 36. Further, when obtained specific surface area Sd is equal to standard specific surface area Sc, that is, when initial specific surface area S0 is at the standard center value, the corresponding standard drying temperature T is "175° C.". In this example, the value of standard specific surface area Sc is "4.2". When substituting "175° C." into the approximate equation, approximately "0.1" is derived as reference change amount ΔSC of electrode plate specific surface area Se resulting from drying the electrode mixture 50.

Also, in this example, initial specific surface area S0, which serves as obtained specific surface area Sd, tolerates variations within "±0.4" as tolerance α. Thus, for example, when the difference of initial specific surface area S0 and standard specific surface area Sc corresponds to the lower limit of the tolerable range (6=−0.4), target drying change amount ΔST becomes "0.5" ("ΔST=0.5", refer to FIG. 12). In this case, the value of obtained specific surface area Sd is equal to "3.8". Further, the value of target drying change amount ΔST "0.5" is substituted into the approximate equation. This yields approximately "184° C." as drying temperature T that corrects the difference "δ=−0.4" of obtained specific surface area Sd and standard specific surface area Sc.

In this manner, in the present embodiment, drying temperature T serving as the drying condition is set based on change amount ΔS of electrode plate specific surface area Se that varies in accordance with the drying condition so as to correct difference δ of obtained specific surface area Sd and standard specific surface area Sc.

Drying Condition Setting Device

A drying condition setting device used for manufacturing the rechargeable battery 1 will now be described.

Figure 13:
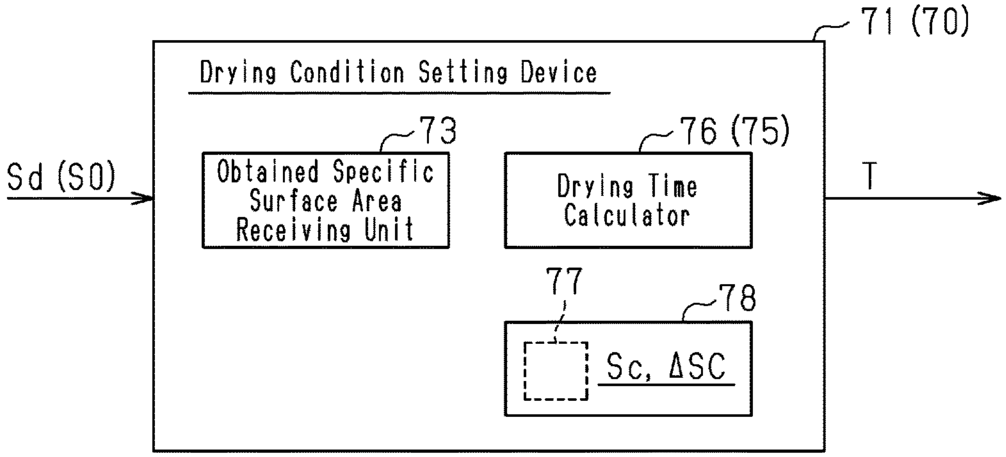
FIG. 13 is a schematic diagram of a drying condition setting device.

As shown in FIG. 13, a manufacturing apparatus 70 for manufacturing the rechargeable battery 1 of the present embodiment includes a drying condition setting device 71. The drying condition setting device 71 includes an obtained specific surface area receiving unit 73 to which obtained specific surface area Sd of the electrode active material 55 included in the electrode mixture 50 is input. The drying condition setting device 71 of the present embodiment includes a drying temperature calculator 76 that serves as a drying condition calculator 75. The drying condition calculator 75 calculates drying temperature T of the electrode mixture 50 from the input obtained specific surface area Sd of the electrode active material 55 to adjust post-drying electrode plate specific surface area Se2.

Specifically, initial specific surface area S0 of the electrode active material 55 obtained in the blending step (refer to FIG. 4, step 201) is input to the drying condition setting device 71 of the present embodiment as obtained specific surface area Sd. Further, the drying condition setting device 71 of the present embodiment holds data table 77 in memory region 78 including the relationship between difference δ of obtained specific surface area Sd and standard specific surface area Sc, target drying change amount ΔST, and drying temperature T set as the drying condition (refer to FIG. 12). In an example, the drying condition setting device 71 includes the memory region 78. The drying temperature calculator 76 of the present embodiment is configured to refer to the data table 77 and calculate drying temperature T of the electrode mixture 50 from the input obtained specific surface area Sd.

Figure 14:
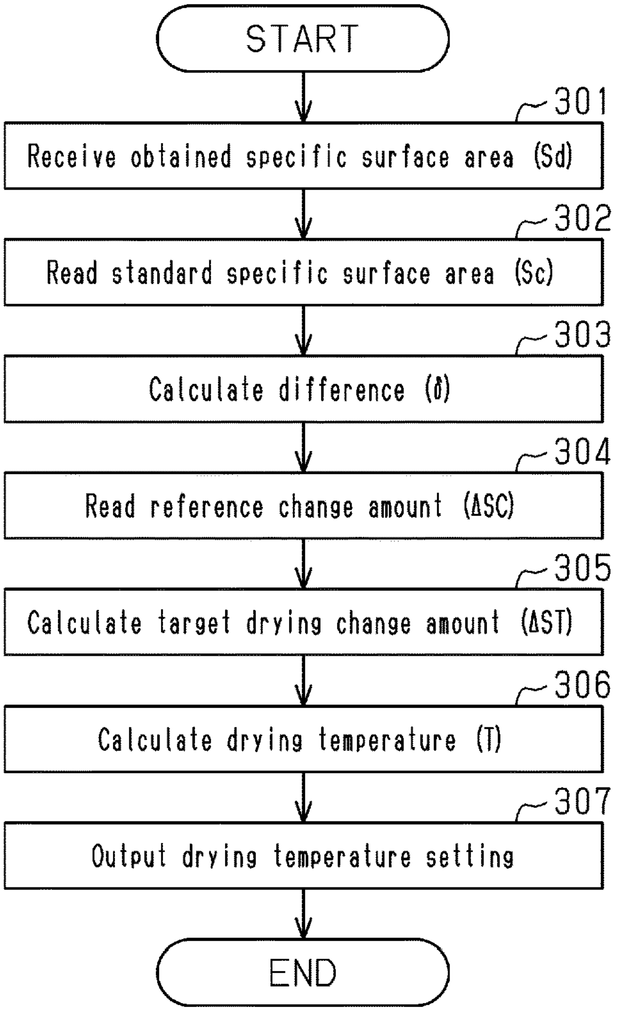
FIG. 14 is a flowchart illustrating a processing procedure for setting the drying temperature with the drying condition setting device.

Specifically, as shown in FIG. 14, when obtained specific surface area Sd is input to the drying condition setting device 71 of the present embodiment receives (step 301), the drying condition setting device 71 then reads standard specific surface area Sc held in the memory region 78 (step 302). Subsequently, the drying condition setting device 71 calculates difference δ of obtained specific surface area Sd and standard specific surface area Sc (step 303, δ=Sd−Sc). Further, the drying condition setting device 71 reads reference change amount ΔSC held in the memory region 78 (step 304). Then, the drying condition setting device 71 of the present embodiment calculates target drying change amount ΔST from reference change amount ΔSC and difference δ of obtained specific surface area Sd and standard specific surface area Sc obtained in step 303 (step 305, ΔST=ΔSC−δ).

Next, the drying condition setting device 71 refers to the data table 77 held in the memory region 78 and calculates drying temperature T that corrects difference δ of obtained specific surface area Sd and standard specific surface area Sc (step 306). Then, the drying condition setting device 71 of the present embodiment is configured to output the setting of drying temperature T obtained in step 306 (step 307).

Operation

When the electrode mixture 50 applied to the substrate 36 is dried, post-drying electrode plate specific surface area Se2 becomes greater than pre-drying electrode plate specific surface area Se1. Further, change amount ΔS of electrode plate specific surface area Se resulting from drying the electrode mixture 50 is affected by the drying condition of the electrode mixture 50 applied to the substrate 36. This allows post-drying electrode plate specific surface area Se2 to be adjusted based on the setting of the drying condition.

The present embodiment has the following advantages.

(1) When manufacturing the electrode sheet 35, which forms the electrode plate 51 of the rechargeable battery 1, a step of applying the electrode mixture 50 including the electrode active material 55 to the substrate 36 that becomes the current collector 31 and a step of drying the electrode mixture 50 applied to the substrate 36 are performed. Also, specific surface area S of the electrode active material 55 included in the electrode mixture 50 is obtained before the step of drying the electrode mixture 50 applied to the substrate 36. Further, the obtained specific surface area S of the electrode active material 55 is referred to as obtained specific surface area Sd, and specific surface area S of the electrode active material 55 in a state in which the electrode mixture 50 applied to the substrate 36 forms the electrode plate 51 is referred to as electrode plate specific surface area Se. Then, the drying condition of the electrode mixture 50 is set in accordance with obtained specific surface area Sd so that post-drying electrode plate specific surface area Se2 is adjusted.

The above configuration readily reduces variations of electrode plate specific surface area Se, or specific surface area S of the electrode active material 55 in a state in which the electrode mixture 50 applied to the substrate 36 forms the electrode plate 51, without complicating the configuration. This improves uniformity of the battery performance.

(2) When drying the electrode mixture 50, drying temperature T is set to be higher as obtained specific surface area Sd becomes smaller.

Specifically, change amount ΔS of electrode plate specific surface area Se resulting from drying the electrode mixture 50 increases as drying temperature T of the electrode mixture 50 applied to the substrate 36 becomes higher. Thus, the above configuration readily adjusts post-drying electrode plate specific surface area Se2 by using drying temperature T of the electrode mixture 50 as the subject of the drying condition that is set in accordance with obtained specific surface area Sd of the electrode active material 55. This reduces variations of electrode plate specific surface area Se and improves uniformity of the battery performance.

(3) When drying the electrode mixture 50, drying temperature T is set based on change amount ΔS of electrode plate specific surface area Se that varies in accordance with the drying condition so as to correct difference δ of obtained specific surface area Sd and standard specific surface area Sc.

The above configuration accurately adjusts post-drying electrode plate specific surface area Se2. This reduces variations of electrode plate specific surface area Se and improves uniformity of the battery performance effectively.

(4) When manufacturing the electrode sheet 35, a step of blending the raw materials of the electrode mixture 50 and a step of kneading the blended electrode mixture 50 are performed. Further, in the applying step, the kneaded electrode mixture 50 is applied to the substrate 36. Then, initial specific surface area S0 of the electrode active material 55 obtained prior to the blending step is used as obtained specific surface area Sd in setting drying temperature T.

Typically, the electrode active material 55 in a state of an unblended raw material tolerates variations in initial specific surface area S0 within the predetermined tolerance α. Accordingly, initial specific surface area S0 of the electrode active material 55 in the state of an unblended raw material varies between manufacturing units, or lots. Thus, the above configuration adjusts post-drying electrode plate specific surface area Se2 by setting the drying condition in accordance with obtained specific surface area Sd of the electrode active material 55 efficiently and accurately. This reduces variations of electrode plate specific surface area Se and improves uniformity of the battery performance effectively.

Furthermore, the measurement value of initial specific surface area S0 of the electrode active material 55 is often indicated in the form of specifications, labels, or the like. Thus, with the above configuration, specific surface area S of the electrode active material 55 included in the electrode mixture 50 can be easily obtained before the step of drying the electrode mixture 50 applied to the substrate 36 without performing a special measurement task. In this manner, the drying condition is efficiently set in accordance with obtained specific surface area Sd of the electrode active material 55.

The above embodiment may be modified as described below. The above embodiment and the following modifications can be combined as long as the combined modifications remain technically consistent with each other.

In the above embodiment, initial specific surface area S0, which is specific surface area S of the electrode active material 55 as a raw material of the electrode mixture 50, is obtained in the blending step of the electrode mixture 50. Then, initial specific surface area S0 is used as obtained specific surface area Sd in setting the drying condition in accordance with obtained specific surface area Sd. However, there is no limit to such a configuration as long as obtained specific surface area Sd is specific surface area S of the electrode active material 55 that is obtained before the step of drying the electrode mixture 50 applied to the substrate 36. For example, pre-drying electrode plate specific surface area Se1 may be measured and the measurement value may be used as obtained specific surface area Sd. Alternatively, specific surface area S after kneading the electrode mixture 50 may be measured before the electrode mixture 50 is applied to the substrate 36, and the measurement value may be used as obtained specific surface area Sd. Further, standard specific surface area Sc may only specify the value at the time of acquisition.

The value of standard specific surface area Sc may be set in any manner. Also, the values within tolerance α may be set in any manner. For example, the plus tolerance α may differ from the minus tolerance α. That is, standard specific surface area Sc does not have to be the standard center value.

In the above embodiment, standard specific surface area Sc serving as the standard center value is set to "4.2", and standard drying temperature T corresponding to when obtained specific surface area Sd is equal to standard specific surface area Sc is set to "175° C.". Then, the value of reference change amount ΔSC obtained is "0.1". However, there is no limit to such a configuration as long as reference change amount ΔSC is a value indicating change amount ΔS of electrode plate specific surface area Se resulting from drying the electrode mixture 50 under a predetermined drying condition. Specifically, the drying condition for setting reference change amount ΔSC includes standard drying temperature T and may be changed in any manner.

In the above embodiment, the drying condition setting device 71 refers to the data table 77 held in the memory region 78 and calculates drying temperature T so as to correct difference δ of obtained specific surface area Sd and standard specific surface area Sc. The data table 77 stores in advance the relationship between difference δ of obtained specific surface area Sd and standard specific surface area Sc, target drying change amount ΔST, and drying temperature T set as the drying condition.

However, there is no limit to such a configuration. For example, as shown in FIG. 15, data table 77B storing the relationship of obtained specific surface area Sd and drying temperature T set as the drying condition may be used. The drying condition setting device 71 may refer to the data table 77B and calculate drying temperature T in accordance with obtained specific surface area Sd. Specifically, experiments, simulations, and the like may be conducted in advance to obtain the relationship of obtained specific surface area Sd and drying temperature T set as the drying condition based on change amount ΔS of electrode plate specific surface area Se that varies in accordance with drying temperature T. This simplifies the configuration.

Alternatively, the drying condition setting device 71 may use data table 77 storing the relationship between difference δ of obtained specific surface area Sd and standard specific surface area Sc and drying temperature T set as the drying condition. Further alternatively, the drying condition setting device 71 may use data table 77 storing the relationship of target drying change amount ΔST and drying temperature T set as the drying condition. In other words, as long as drying temperature T is eventually calculated in accordance with obtained specific surface area Sd as the drying condition, calculation using a mathematical expression does not have to be performed before the drying condition setting device 71 refers to the data table 77.

The drying condition setting device 71 holds in advance the mathematical expression indicating the relationship between change amount ΔS of electrode plate specific surface area Se resulting from drying the electrode mixture 50 and drying temperature T. In this case, the mathematical expression does not have to be a linear approximate expression such as "y=ax−b". Also, as described in the above example, such a mathematical expression may be used to calculate drying temperature T in accordance with obtained specific surface area Sd without the data table 77.

In the above embodiment, drying temperature T is set in accordance with obtained specific surface area Sd as the drying condition of the electrode mixture 50 to adjust post-drying electrode plate specific surface area Se2. However, there is no limit to such a configuration. A drying condition other than drying temperature T may be changed to adjust post-drying electrode plate specific surface area Se2.

As shown in FIG. 16, a drying condition setting device 71C includes a drying time calculator 79 that serves as the drying condition calculator 75C. The drying time calculator 79 may set drying time t in accordance with obtained specific surface area Sd.

As shown in FIG. 17, since the migration of the binder that occurs when the electrode mixture 50 is dried causes the change in electrode plate specific surface area Se resulting from drying the electrode mixture 50 (refer to FIGS. 6 and 7), drying time t also affects advancement of the migration in the same manner as drying temperature T. FIG. 17 is a diagram illustrating that there is a correlation between electrode plate specific surface area Se resulting from drying the electrode mixture 50 and drying time t and is not showing actual measurement data. Nonetheless, as the model of FIG. 17 shows, the migration advances as the drying time t becomes longer in an actual electrode mixture 50. This indicates that change amount ΔS of electrode plate specific surface area Se resulting from drying the electrode mixture 50 also increases.

Therefore, when drying the electrode mixture 50, drying time t may be set to become longer as obtained specific surface area Sd becomes smaller. Even such a configuration readily adjusts post-drying electrode plate specific surface area Se2. This reduces variations of electrode plate specific surface area Se and improves uniformity of the battery performance.

Figures 18, 19, 20:
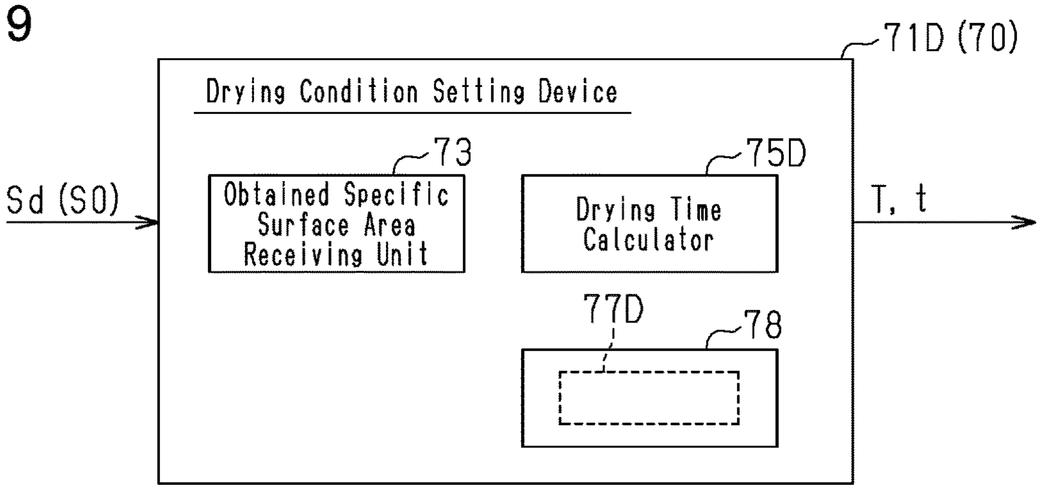
FIG. 18 is a diagram illustrating setting of the drying time in accordance with the obtained specific surface area.
FIG. 19 is a schematic diagram showing another example of the drying condition setting device.
FIG. 20 is a diagram illustrating another example in which the drying condition is set in accordance with the obtained specific surface area.

Also, as shown in FIG. 18, the drying time calculator 79 may calculate drying time t in accordance with obtained specific surface area Sd by using data table 77C that correlates, for example, obtained specific surface area Sd and drying time t set as the drying condition. Even when drying time t serves as the subject of the drying condition that is set in accordance with obtained specific surface area Sd of the electrode active material 55, the design of the data table 77C may be changed.

In an example, the data table 77C may correlate difference δ of obtained specific surface area Sd and standard specific surface area Sc, target drying change amount ΔST, and drying time t set as the drying condition. Alternatively, the data table 77C may correlate difference δ of obtained specific surface area Sd and standard specific surface area Sc and drying time t set as the drying condition. Then, the data table 77C may correlate target drying change amount ΔST and drying time t set as the drying condition.

In other words, as long as drying time t is calculated in accordance with obtained specific surface area Sd as the drying condition, calculation using a mathematical expression does not have to be performed before the drying condition setting device 71C refers to the data table 77C. Instead of the data table 77C, the drying condition setting device 71C may hold an approximate expression indicating the relationship between change amount ΔS of electrode plate specific surface area Se resulting from drying the electrode mixture 50 and drying time t.

As shown in FIGS. 19 and 20, a drying condition setting device 71D may include a drying condition calculator 75D that calculates drying temperature T and drying time tin accordance with obtained specific surface area Sd. For example, the drying condition calculator 75D may use data table 77D including the relationship of obtained specific surface area Sd, and drying temperature T and drying time t that are set as the drying conditions. In this case, also, as long as drying temperature T and drying time t are calculated in accordance with obtained specific surface area Sd as the drying conditions, calculation using a mathematical expression does not have to be performed before the drying condition setting device 71D refers to the data table 77D. Such a configuration further accurately adjusts post-drying electrode plate specific surface area Se2.

In the above embodiment, a method for calculating drying temperature T in accordance with obtained specific surface area Sd so as to correct difference δ of obtained specific surface area Sd and standard specific surface area Sc is described using an example in which obtained specific surface area Sd is less than standard specific surface area Sc. However, there is no limit to such a configuration, and drying temperature T may be calculated to correct difference δ of obtained specific surface area Sd and standard specific surface area Sc in the same manner when obtained specific surface area Sd is greater than standard specific surface area Sc.

In the above embodiment, drying temperature T can be calculated in accordance with obtained specific surface area Sd that is greater than standard specific surface area Sc through the same procedure within a range where the approximate expression is satisfied even if drying temperature T is in a temperature range that is lower than the standard value of "175° C." (refer to FIGS. 10 to 12).

The limit of adjustment in electrode plate specific surface area Se by changing the setting of drying temperature T based on the migration effect, which occurs when electrode mixture 50 is dried, corresponds to the range over which electrode plate specific surface area Se increases when the electrode mixture 50 is dried (refer to FIG. 11). In the above embodiment, if obtained specific surface area Sd is equal to standard specific surface area Sc, change amount ΔS of electrode plate specific surface area Se resulting from drying the electrode mixture 50, or reference change amount ΔSC, is "0.1". Thus, in the above embodiment, the limit of adjustment in electrode plate specific surface area Se by changing the setting of drying temperature T, that is, the lower limit of target drying change amount ΔST, is "−0.1".

Further, in the above embodiment, the relationship between change amount ΔS of electrode plate specific surface area Se resulting from drying the electrode mixture 50 and drying temperature T may not satisfy the approximate expression in a region where target drying change amount ΔST is near the adjustment limit. However, even in such a case, experiments, simulations, and the like may be conducted in advance to obtain the relationship between change amount ΔS of electrode plate specific surface area Se when the electrode mixture 50 is dried and drying temperature T within a range of the adjustment limit including a region near the adjustment limit.

Specifically, in this case, experiments, simulations, and the like may be conducted in advance to prepare data table 77 and an approximate expression for the range of the adjustment limit including a region near the adjustment limit. The approximate expression in this case may not be a linear approximate equation such as "y=ax−b". Further, the data table 77 does not have to include a linear relationship of obtained specific surface area Sd and the set drying condition. Such a configuration widens the range that appropriately adjusts post-drying electrode plate specific surface area Se2.

The limit of adjustment in electrode plate specific surface area Se by changing the setting of the drying condition, that is, the lower limit of target drying change amount ΔST, corresponds to the specification of the manufactured electrode sheet 35. Specifically, the adjustment limit is not necessarily equal to "−0.1", which is the lower limit of target drying change amount ΔST in the above embodiment. Thus, even when obtained specific surface area Sd is greater than standard specific surface area Sc, difference δ of obtained specific surface area Sd and standard specific surface area Sc may be corrected throughout the entire range of permissible tolerance α within the limit of adjustment by changing the setting of the drying condition.

In the above embodiment, when drying the electrode mixture 50, drying temperature T is set in accordance with obtained specific surface area Sd based on change amount ΔS of electrode plate specific surface area Se that varies in accordance with the drying condition so as to correct difference δ of obtained specific surface area Sd and standard specific surface area Sc. However, there is no limit to such a configuration. The drying temperature T set in accordance with obtained specific surface area Sd does not have to completely correct difference δ of obtained specific surface area Sd and standard specific surface area Sc. In other words, the degree of correction is not limited as long as variations of electrode plate specific surface area Se are reduced by adjusting post-drying electrode plate specific surface area Se2. Further, standard specific surface area Sc does not have to be specified.

In the above embodiment, specific surface area S of the electrode active material 55 is measured by a BET method that uses nitrogen as the adsorption gas. However, there is no limit to such a configuration, and the adsorption gas does not have to be nitrogen. Furthermore, specific surface area S of the electrode active material 55 does not have to be a BET specific surface area and may be a value measured by another method.

In the above embodiment, the drying condition is set in accordance with obtained specific surface area Sd of the electrode active material 55 during manufacture of the electrode sheet 35N of the negative electrode 4. However, there is no limit to such a configuration. The drying condition may be set in accordance with obtained specific surface area Sd during manufacture of the electrode sheet 35P of the positive electrode 3.

In the above embodiment, the electrode body 10 of the rechargeable battery 1 is formed by rolling the stack of the positive and negative electrode sheets 35P and 35N arranged with the separator 5 held in between. However, there is no limit to such a structure, and the rechargeable battery 1 may include the electrode body 10 having a stack of flat layers.

Further, in the above embodiment, the method for manufacturing the rechargeable battery of the present disclosure is applied to the rechargeable battery 1 including the structure of a lithium-ion rechargeable battery. However, there is no limit to such a configuration, and the method for manufacturing the rechargeable battery of the present disclosure may be applied to a rechargeable battery 1 that is not a lithium-ion rechargeable battery.

The shapes of the positive electrode terminal 38P and the negative electrode terminal 38N are not limited to those shown in FIG. 1 and may be changed. The shape of the case 20, which defines the shape of the rechargeable battery 1, is not limited to the form of a flat box and may be, for example, cylindrical.

Technical concepts that can be understood from the above embodiment and the modified examples will now be described.

(a) A BET specific surface area is used as the specific surface area.

(b) A mathematical expression indicating a relationship of the change amount of the electrode plate specific surface area resulting from the drying the electrode mixture and the drying condition is held.

(c) A data table correlating the obtained specific surface area and the set drying condition is held.

(d) A data table correlating the difference of the obtained specific surface area and the standard specific surface area and the set drying condition is held.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for manufacturing a rechargeable battery, the method comprising:

applying an electrode mixture that includes an electrode active material to a substrate that becomes a current collector;

drying the applied electrode mixture;

obtaining a specific surface area of the electrode active material before the drying the applied electrode mixture, wherein the obtained specific surface area of the electrode active material is referred to as an obtained specific surface area, and a specific surface area of the electrode active material in a state in which the electrode mixture applied to the substrate forms an electrode plate is referred to as an electrode plate specific surface area; and adjusting the electrode plate specific surface area after the drying the applied electrode mixture by setting a drying condition of the electrode mixture in accordance with the obtained specific surface area, wherein:

a drying temperature of the electrode mixture is set as the drying condition, and the drying temperature is set to be higher as the obtained specific surface area becomes smaller.

2. The method according to claim 1, wherein the drying condition is set based on a change amount of the electrode plate specific surface area that varies in accordance with the drying condition so as to correct a difference of the obtained specific surface area and a predetermined standard specific surface area.

3. The method according to claim 1, further comprising:

blending raw materials of the electrode mixture; and kneading the blended electrode mixture, wherein the kneaded electrode mixture is applied to the substrate, and the specific surface area of the electrode active material obtained before the blending raw materials serves as the obtained specific surface area.

4. A method for manufacturing a rechargeable battery, the method comprising:

applying an electrode mixture that includes an electrode active material to a substrate that becomes a current collector;

drying the applied electrode mixture:

obtaining a specific surface area of the electrode active material before the drying the applied electrode mixture, wherein the obtained specific surface area of the electrode active material is referred to as an obtained specific surface area, and a specific surface area of the electrode active material in a state in which the electrode mixture applied to the substrate forms an electrode plate is referred to as an electrode plate specific surface area; and adjusting the electrode plate specific surface area after the drying the applied electrode mixture by setting a drying condition of the electrode mixture in accordance with the obtained specific surface area, wherein:

a drying time of the electrode mixture is set as the drying condition, and the drying time is set to be longer as the obtained specific surface area becomes smaller.

* * * * *